United States Patent [19]
Matsumoto et al.

[11] Patent Number: 5,455,125
[45] Date of Patent: Oct. 3, 1995

[54] MEDIUM OR LARGE SCALE SEALED METAL OXIDE/METAL HYDRIDE BATTERY

[75] Inventors: Isao Matsumoto, Osaka; Munehisa Ikoma, Nara; Nobuyasu Morishita, Fujiidera; Yoshinori Toyoguchi, Yao; Hiromu Matsuda, Hyogo, all of Japan

[73] Assignee: Matsushita Electric Industrial Co., Ltd., Osaka, Japan

[21] Appl. No.: 330,603

[22] Filed: Oct. 28, 1994

Related U.S. Application Data

[63] Continuation of Ser. No. 8,908, Jan. 25, 1993, abandoned.

[30] Foreign Application Priority Data

Sep. 18, 1992 [JP] Japan .................................. 4-248400

[51] Int. Cl.$^6$ .................................................. H01M 4/02
[52] U.S. Cl. ............................ 429/59; 429/101; 429/218; 429/224; 429/247; 429/249; 420/900
[58] Field of Search ............................ 420/400; 429/218, 429/224, 247, 249, 59, 101

[56] References Cited

U.S. PATENT DOCUMENTS

| | | |
|---|---|---|
| 4,049,027 | 9/1977 | Seiger . |
| 4,251,603 | 2/1981 | Matsumoto . |
| 4,716,088 | 12/1987 | Reichman et al. .................. 429/101 |
| 4,835,318 | 5/1989 | Ikoma et al. ........................ 429/206 |
| 4,837,119 | 6/1989 | Ikoma et al. ........................ 429/206 |
| 4,849,205 | 7/1989 | Hong . |
| 4,925,748 | 5/1990 | Ikoma et al. . |
| 4,935,318 | 6/1990 | Ikoma et al. . |
| 4,946,646 | 8/1990 | Gamo et al. . |
| 5,100,723 | 3/1992 | Iwasaki et al. . |

FOREIGN PATENT DOCUMENTS

| | | |
|---|---|---|
| 0284333A | 9/1988 | European Pat. Off. . |
| 0384945A | 9/1990 | European Pat. Off. . |
| 0432342A | 6/1991 | European Pat. Off. . |
| 0432342 | 6/1991 | European Pat. Off. . |
| 0462889A1 | 12/1991 | European Pat. Off. . |
| 0462889A | 12/1991 | European Pat. Off. . |
| 0468568A | 1/1992 | European Pat. Off. . |
| 0523284A | 1/1993 | European Pat. Off. . |
| 55-39179 | 3/1980 | Japan . |
| 56-102076 | 8/1981 | Japan . |
| 64-57568 | 3/1989 | Japan . |

OTHER PUBLICATIONS

Database WPIL Week 9136, Derwent Publications Ltd., London GB; AN 91-263297 & JP-A-3 173 062 (Matsushita Electric Industrial K.K.) 26 Jul. 1991 *abstract*.

*Primary Examiner*—Prince Willis, Jr.
*Assistant Examiner*—M. Nuzzolillo
*Attorney, Agent, or Firm*—Stevens, Davis, Miller & Mosher

[57] ABSTRACT

A sealed storage battery for use in potable power supply is improved by using metal oxide-hydrogen storage alloy to have a higher capacity and a smaller weight. The battery has a structure which comprises a combination of a positive electrode having a high energy density in a wide range of temperature and consisting of a bulk high porosity body filled with an active material composed of solid solutions such as typical Co solid solution, oxide powders such as typically $Ca(OH)_2$ and ZnO, with an addition of graphite for rendering the electrode reaction effective; and a high capacity negative electrode of hydrogen storage alloy having a reduced equilibrium hydrogen pressure, and where the aforementioned characteristics at high temperatures are further enhanced by an electrolyte suitable to high temperatures, short-circuits are prevented by a chemically stable separator, and a structure sealing a container and a safety vent is excellent in air-tightness and reliability.

63 Claims, 7 Drawing Sheets

FIG. IA 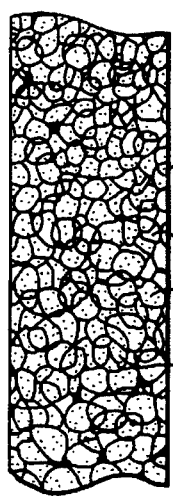
FIG. IB 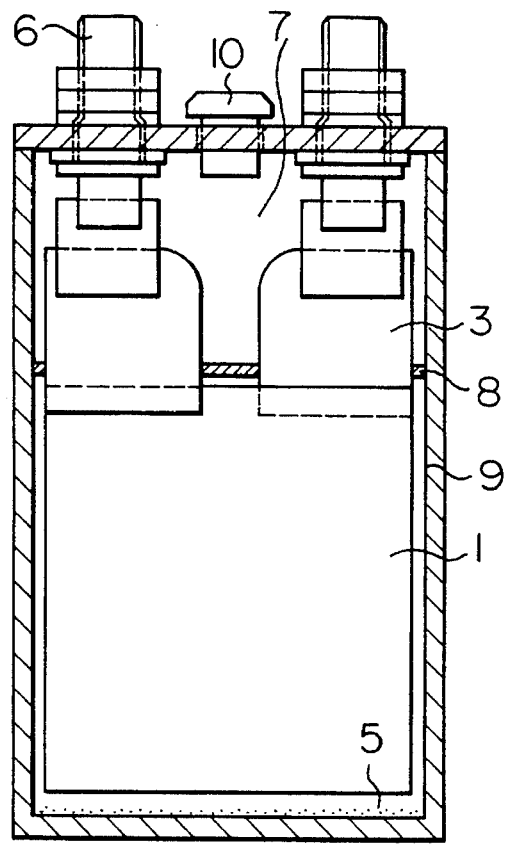
FIG. IC 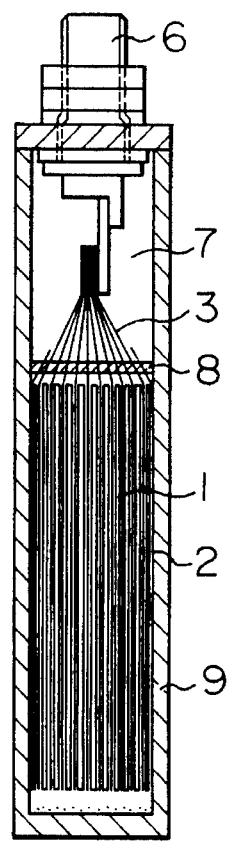
FIG. ID 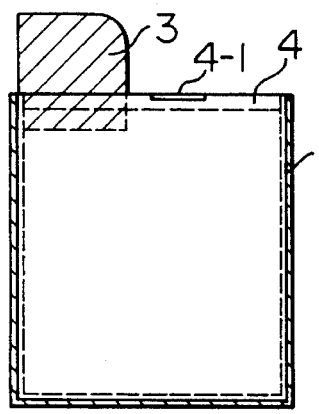
FIG. IE 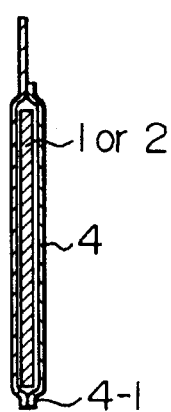
FIG. IF 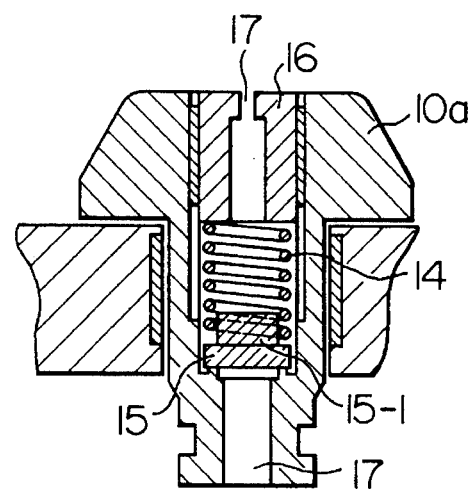

a : $MmNi_{3.8}Co_{0.5}Mn_{0.4}Al_{0.3}$
a-1 : $MmNi_{3.8}Co_{0.5}Mn_{0.4}Al_{0.3}$ (QUENCHED)
b : $ZrMn_{0.6}V_{0.1}Ni_{1.3}Ti_{0.2}$
b-1 : $ZrMn_{0.6}V_{0.1}Ni_{1.3}Ti_{0.2}$ (QUENCHED)

(ADDITIVE TO POSITIVE ELECTRODE)
d: GRAPHITE OR Ni
e: GRAPHITE + Co (SOLID SOLUTION)
f: GRAPHITE + Co (SOLID SOLUTION) + Cdo
g: GRAPHITE + Co (SOLID SOLUTION) + Co(OH)$_2$
h: GRAPHITE + Co (SOLID SOLUTION) + Co(OH)$_2$ + ZnO

MEDIUM OR LARGE SCALE SEALED METAL OXIDE/METAL HYDRIDE BATTERY

This application is a continuation of application Ser. No. 08/008,908, filed Jan. 25, 1993 now abandoned.

BACKGROUND OF THE INVENTION

1. Field of the Invention

The present invention relates to a middle or large scale sealed metal oxide/metal hydride battery of more than 10 Ah having excellent charging characteristics at high temperatures and excellent reliability which comprises a positive electrode of a metal oxide which has a high capacity and is light in weight and a negative electrode of a hydrogen storage alloy having a high capacity and a lower equilibrium hydrogen gas pressure.

2. Description of the Related Art

Attention has been focused on an electrode of a hydrogen storage alloy capable of reversibly absorbing and desorbing hydrogen about at normal temperature under normal pressure as a new negative electrode for use in alkaline storage batteries because it permits charging and discharging and in addition it is superior in energy density to the cadmium electrode known for many years.

Particularly, during the last about ten years, intensive research has been conducted vigorously on such electrodes in the field of cell and battery industry. As a result of the research and development, hydrogen storage alloy electrodes have been employed in commercially available high capacity secondary cells which have started to be used practically in various handy electronic appliances.

These cells are mainly of a miniaturized sealed cell type, typically a cylindrical sealed type, and nickel-hydrogen storage batteries with the positive electrode being nickel and the negative electrode being a hydrogen storage alloy.

They generally have a structure where both a nickel positive electrode and a negative electrode of a hydrogen storage alloy are rolled into a spiral form with a resin separator being interposed between the positive electrode and the negative electrode, the roll being inserted into a cylindrical metal can and sealed with a lid equipped with a salty vent.

As the nickel positive electrode, there is used a sintered electrode which is manufactured by impregnating a sintered nickel substrate as used generally in the nickel-cadmium cells with a solution of a nickel salt and then converting the salt into nickel hydroxide, or an electrode which is manufactured by mixing a powder containing a major component of nickel hydroxide with a small amount of additives such as cobalt and cobalt oxide into a paste, filling the paste into a high porosity electrode substrate consisting of a bulk nickel sponge, and then drying, followed by subjecting to a molding under pressure (referred to as a SME type hereunder; These are disclosed in U.S. Pat. Nos. 4,251,603 and 4,935,318, and Japanese Patent KOKAI (Laid-open) Nos. 56-102076 and 55-39179).

As the hydrogen storage alloy negative electrode, on the other hand, there are known (1) an electrode which is manufactured by filling a powdery hydrogen storage alloy such as a mish-metal of a LnNi5 system, where Ln represents one of the rare earth elements having an atomic number from 57 to 71 or a mixture thereof (referred to as Mm hereunder) into a substrate of a bulk porous nickel sponge (as disclosed in U.S. Pat. No. 4,935,318), (2) an electrode which is manufactured by applying the powdery alloy to a plane perforated plate with an adhesive, (3) an electrode which is manufactured by applying a powdery Ti based alloy of a TiNi system (as disclosed in U.S. Pat. No. 4,849,205) to a plane perforated plate with an adhesive, and (4) an electrode which is manufactured by applying the above, followed by sintering. As other hydrogen storage alloy materials, there have been proposed a Zr based alloy of a ZrNi system which is promising for use as electrodes from the standpoint of high capacity (as disclosed in U.S. Pat. No. 4,946,646).

These negative electrodes are used in combination with any one of the positive electrodes described above and rolled in a spiral form with a separator being interposed therebetween. The capacity of the negative electrode is generally larger than that of the positive electrode.

As the separator materials, there are normally used non-woven fabrics made of polyamide resin fibers which are used generally in the nickel-cadmium cells, though the use of non-woven fabrics made of sulfonated polyolefin resin fibers which have a remarkable effect in reduction of self-discharge has been proposed already as disclosed in U.S. Pat. Nos. 4,837,119 and 5,100,723 and Japanese Patent KOKAI (Laid-open) No. 64-57568.

The electrolyte to be used is principally a solution of caustic potash identical to that used in the nickel-cadmium cells.

In this type of cell, if the partial pressure of hydrogen in the cell is reduced below the equilibrium hydrogen gas pressure of the hydrogen storage alloy used, the alloy releases hydrogen gas. Therefore, if the cell is used open, the amount of the electrode decreases due to the escape of the gas causing a deterioration of the cell performance and an increase in the internal cell pressure.

Therefore, a sealed cell equipped with a safety vent should be constituted. The pressure at which the safety vent of the cell is operated is determined by taking into consideration an increase in the internal cell pressure due to oxygen and hydrogen at the time of overcharging and an increase in the equilibrium hydrogen gas pressure when a reaction of gaseous oxygen and hydrogen proceeds accompanied by an increase in temperature.

The cells which have been proposed until now are mainly of miniaturized cylindrical sealed type and are excellent in resistance to pressure at the locations of the container and the seal. Therefore, even if an overcharging at such a large current as 1 C (the cell is charged at one hour rate) occurs, the tightness can be retained allowing a higher pressure for operating the safety vent to be employed. The pressure opening the vent to be used is generally set in the range of 10 to 30 kg/cm$^2$. This is partly attributable to a great ability of dissipating heat, as in a small type cell.

Description has been made heretofore on the outline of the prior art techniques as to miniaturized nickel-hydrogen storage batteries which have started to be put into practical use already.

In recent years, however, a vigorous need has been created for high energy density cells having high reliability and a medium or great capacity as portable supplies to be used in a wide variety of applications such as domestic electrical appliances, electric automobiles and the like.

The metal oxide-hydrogen storage batteries are considered to be of a type of cell promising for the need. As the metal oxide, nickel oxide and manganese oxide are suitable from the economical point of view. Some attempts have been made to manufacture a nickel-hydrogen storage battery using nickel oxide as reported. However, few practical cell structures have been proposed with respect to a medium capacity cell (defined here as a capacity of 10 Ah to 100 Ah) and a large capacity cell (defined here as a capacity no less than 100 Ah) at present.

Attention is directed to the nickel-hydrogen storage battery as being of a typical cell type representing the metal oxide-hydrogen storage batteries. There are many technical problems to be overcome in modifying the small cells of this type to have a medium or large capacity while retaining the characteristics of the small cells, which problems will be discussed hereunder.

1. Enhancement in energy density and high reliability

Particularly, when the storage batteries are used as portable supplies, great interest is directed to increasing the energy density per unit weight (Wh/kg) as opposed to the small cells. Therefore, it is important to use electrodes having a lighter weight and a higher capacity per unit volume in combination. However, in the medium or large capacity cells, an increase in temperature owing to poor heat dissipation and high temperature atmosphere caused during operation diminishes the charge acceptability of conventional positive electrodes, if employed as they are, to inhibit attainment of desired energy density. Moreover, in order to obtain a high reliability long life cell, an improvement of electrode structure is more required to prevent dislodging of positive and negative electrode materials than is required for the small cells.

2. Structure of sealed cells

Sealed medium or large capacity cells are difficult to manufacture in the cylindrical form because of their high capacity as opposed to the small cells. For this reason, a square form is preferably employed, though it causes generally a significant reduction in the resistance to pressure of the container. It is necessary, therefore, to suppress the internal cell pressure at a smaller magnitude than the conventional one even at the last stage of charging, at which the internal cell pressure is the highest in the normal operation of the cell. In addition, a structure for imparting durability to sealings such as poles is necessary to employ.

3. Lower self-discharge

This cell type is said to undergo seriously great self-discharge as compared to the nickel-cadmium cells. When such highly self-discharging cells are employed in the applications where many opportunities to use them at high temperatures or to leave them unattended occur, they undergo a serious reduction in capacity so that the practical use of them may be hindered. Therefore, the self-discharge must be lowered.

4. Establishment of safety

Generally, there has been an increasing risk of the exotherm caused by shorting between the positive electrode and the negative electrode or of the explosion caused by a reaction between gaseous oxygen and hydrogen evolving inside the cell as the capacity of the cell is increased to a medium or high level. Therefore, there is a need for development of a highly safe cell by arranging a cell structure which is difficult to cause short-circuit, or does not cause any ignition even if a short-circuit occurs, or does not allow the gaseous oxygen and hydrogen to contact any source of ignition.

As above, there are many technical problems to be overcome in order to allow the nickel-hydrogen storage battery with a hydrogen storage alloy having a capacity ranging from a low level to a medium or high level to find a wide variety of practical application.

The present invention intends to overcome the aforementioned problems. That is, it is an object of the present invention to provide a sealed metal oxide-hydrogen storage battery having a higher energy density (especially, in the terms of Wh/kg) and a high reliability in a wide range from a higher temperature to a lower temperature, having excellent safety with regard to strength and evolution of internal gases, and a lower level of self-discharge.

SUMMARY OF THE INVENTION

In order to overcome the aforementioned problems, in one aspect, the present invention provides a constitution for enhancing the energy density per unit weight (Wh/kg) where an active material for each of the positive electrode and the negative electrode is supported on a bulk substrate for electrode as a means for allowing both the positive electrode and the negative electrode to be higher in energy density and lighter in weight.

In another aspect, for suppressing a rise of the temperature of the cell, the present invention uses at least one selected from the group consisting of metal solid solutions and metal oxides of Ca, Ag, Mn, Zn, Sr, V, Ba, Sb, Y, and rare earth elements as additives to be added to the positive electrode active material.

In still another aspect, the present invention employs as the hydrogen storage alloy to be used as the negative electrode MmNi$\alpha$ (4.5$\leq\alpha\leq$5.5) where the amount of La in Mm and the amounts of Mn and Co to be substituted for Ni are increased, or ZrNi$\beta$ (1.9$\leq\beta\leq$2.4) where the amounts of Ti and V to be substituted for Zr and Ni are increased.

With respect to the alkaline electrolyte according to the present invention, the amounts of NaOH and LiOH to be added are up to 3.5 moles/l for NaOH and up to 1.5 moles/l for LiOH.

In still another aspect, the present invention employs a separator made of a polyolefin resin, for example, polypropylene resin, especially sulfonated polypropylene, the separator being interposed between the positive electrode and the negative electrode.

In still another aspect, the present invention provides a housing including a cell lid and a container equipped with a safety vent which operates under a differential pressure between the inside and the outside in the range of 2 to 3 kg/cm$^2$.

BRIEF DESCRIPTION OF THE DRAWINGS

FIG. 1(A) is a schematic cross-sectional view of the positive electrode in one embodiment of the present invention, FIG. 1(B) is a schematic vertical cross-sectional view taken parallel to the wider side of a cell in one embodiment of the present invention, FIG. 1(C) is a schematic vertical cross-sectional view taken parallel to the narrower side of the cell, FIG. 1(D) is a schematic front view of an electrode wrapped with a separator in the form of a bag, FIG. 1(E) is a schematic vertical cross-sectional view taken perpendicular to the front side of the wrapped electrode, and FIG. 1(F) is a schematic enlarged cross-sectional view of a safety vent in one embodiment of the present invention.

DETAILED DESCRIPTION OF PREFERRED EMBODIMENTS

Figure 2:
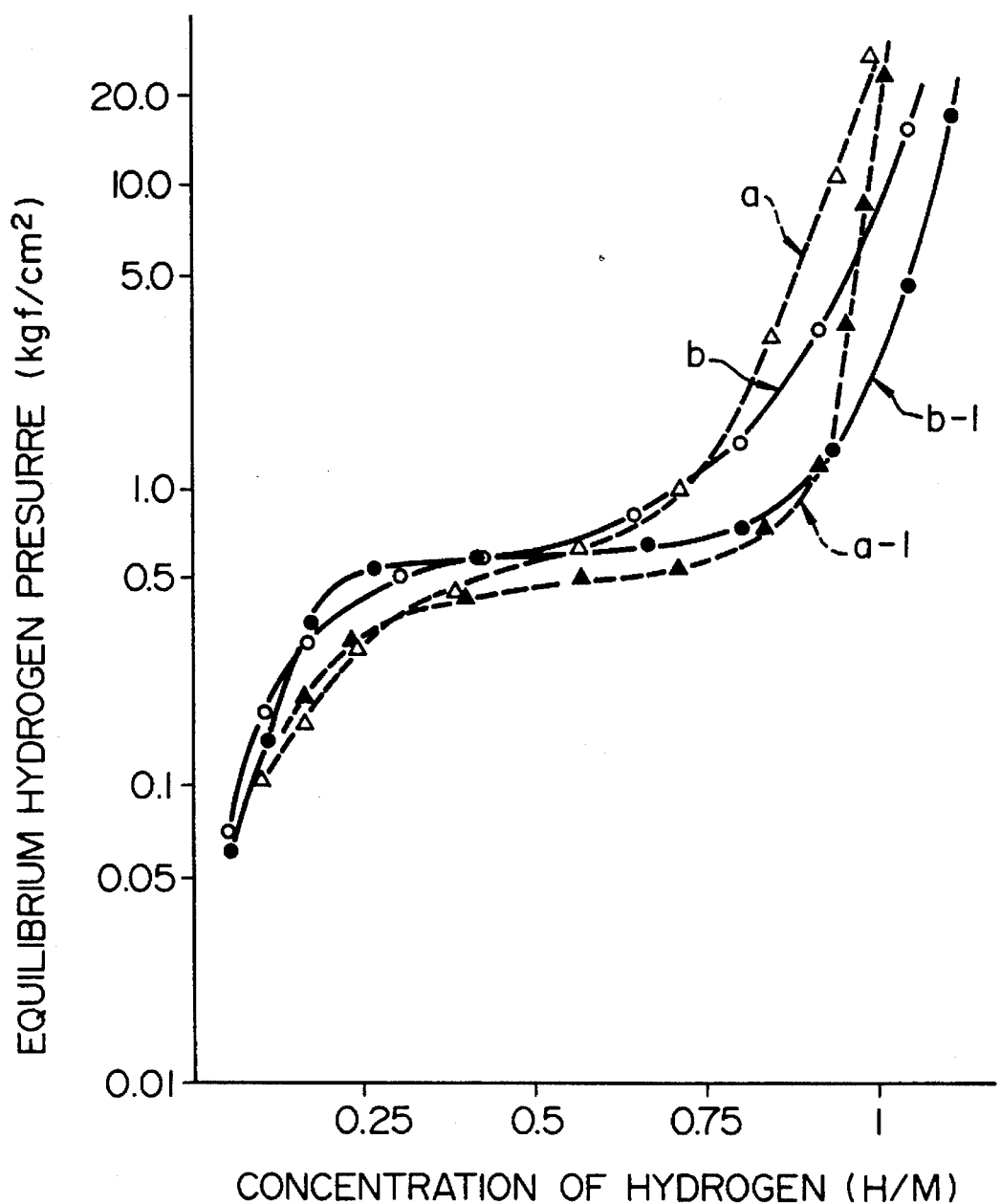
FIG. 2 shows PCT plots of hydrogen storage alloys having a lower hydrogen equilibrium pressure for the negative electrode in Example 1 according to the present invention.

FIG. 1 shows a schematic cross-sectional view of a nickel positive electrode, in which 11 designates a mixture of an active material and an additive, 12 designates a foamed nickel, 13 designates a space, and 2 designates a positive electrode. This substrate for electrode will be described hereunder.

Since nickel oxide to be used for the positive electrode is poor in both adhesiveness and electroconductivity, a method of applying to a thin core may not be employed. For this reason, the use of a bulk metallic substrate for the positive electrode being excellent in active material retention and electron conductivity is preferred. As substrates, a high porosity light nickel sponge or a felt of nickel fibers rather than conventional sintered substrate should preferably be used for achieving an increase in capacity and a reduction in weight of the electrodes. For example, the foamed metallic nickel positive electrode using the nickel sponge having a porosity of 93 to 95% substituting for the sintered substrate having a porosity of 77 to 80% allows the capacity to increase about 30% and the weight to decrease about 20% owing to an increase in the theoretical amount of the active materials filled and a reduction of the materials used as compared to the case of the sintered substrate. However, since the rate of utilization of the active material filled into the bulk reticular substrate having a large pore size is lower, it is effective to allow cobalt and cadmium to form solid solutions inside the nickel hydroxide, or to add powdery cobalt and cobalt oxide as additives as well as powdery nickel, graphite and the like as electric conducting agents.

For the negative electrode, there can be employed an electrode comprising a light substrate similar to those as described above having a high capacity stiff hydrogen storage alloy filled thereinto or a coated electrode comprising an electrode substrate having the alloy applied with an adhesive, since the hydrogen storage alloy is excellent in electron conductivity, so long as in the latter case, the amount of the adhesive should be made as small as possible and such an adhesive having an excellent adhesiveness should be selected because too much adhesive will inhibit the electrode reaction. The adhesives include polytetrafluoroethylene and polystyrol as well as polyvinylalcohol, carboxymethyl cellulose, methyl cellulose and polystyrol which are swollen with the electrolyte, and those adhesives may be used alone or in combination in an appropriate amount. 5% by weight or more of the adhesive significantly diminish the electrode reaction.

Materials forming solid solutions other than Co, an example of which was illustrated above, include salts of Cd, Zn, Ca, Ag, Mn, Sr, V, Ba, Sb, Y and rare earth elements which may be used alone or in combination instead of Co. Among them, Cd is a little superior to Co in charge acceptability at high temperatures, but conversely inferior in the rate of utilization of the active materials at normal temperature. Therefore, the Co solid solution was selected as a representative one.

Next, the hydrogen storage alloy will be described below.

The hydrogen storage alloy may be any one of crystalline alloys of the $CaCu_5$ system and the $MgCu_2$ system, in so far as it has an appropriate high charge-discharge rate and a resistance to oxidation (durability). To make the alloy more durable, alloy particles are subjected to alkaline treatment to remove out elements liable to elute from the surfaces, thereby providing a number of depressions in the surface layer, or rendering the surface layer rich in Ni. Alternatively, it is also important to the protect alloy matrix from oxidation by coating with a material having a catalytic property and a conductivity.

An AB$\alpha$ type alloy ($4.5 \leq \alpha \leq 5.5$) has the $CaCu_2$ type crystalline structure where A represents any one of rare earth elements, a mixture thereof, i.e., a mish-metal, a part of which may be replaced by at least one selected from the group consisting of Ca, Mg, V, Ti, and Zr in an amount corresponding to 0.1 to 0.3 atomic weight, B represents a major component of Ni and a minor component of at least one selected from the group consisting of Co, Al, Mn, Cu, Fe, V, Cr and Si in a total amount corresponding to 0.5 to 2.0 atomic weight. An AB$\beta$ type alloy ($1.9 \leq \beta \leq 2.4$) has the $MgCu_2$ type crystalline structure (C15 type Laves crystalline structure) where A represents a major component of Ni and a minor component of at least one selected from the group consisting of Ti, V, rare earth elements and Ca in an amount corresponding to 0.1 to 0.4 atomic weight, B represents a major component at Ni and a minor component of at least one selected from the group consisting of Co, Al, Mn, Cu, Fe, V and Cr in an amount corresponding to 0.3 to 1.2 atomic weight. The materials to be used for imparting catalytic properties and conductivity to the hydrogen storage alloy particles include metals selected from the group consisting of Ni, Cu, Co, Ag, Cr, Sn and platinum group metals in the form of fine particles, which metals are preferably capable of partly co-melting with the hydrogen storage alloy particles.

A combination of these electrodes affords achieving a high filling density with the active material and a lower cell weight.

When a number of electrodes are used in overlaying relation to each other in a medium or large capacity cells, the group of electrodes is apt to be heated to a high temperature due to poor heat dissipation. To overcome this difficulty, an attempt has been made to dissipate effectively the heat to the outside through a pole by interposing a metal plate between separators in the group of electrodes. However, the group of electrodes still undergoes a serious rise of temperature at the last stage of charging. This is attributed to a rapid increase in the amount of the exotherm caused by the reaction of the oxygen gas evolving at the positive electrode and the hydrogen gas present within the cell or that at the negative electrode. This tendency to higher temperatures is greater in the nickel-hydrogen storage battery than in the nickel-cadmium cell. As a result, in the nickel-hydrogen storage battery, the positive electrode comes to have a significantly reduced acceptability of charging with the cell capacity being reduced. Naturally, this tendency becomes more remarkable at charging under high temperature atmosphere. It is necessary, therefore, that the oxygen gas evolving overvoltage of the positive electrode active material is increased so as to delay the oxygen gas generation until approaching the end of charging. For this improvement, in addition of the aforementioned solid solution formed (Co, Cd), the solid solutions of Ca, Ag, Mn, Zn, Sr, V, Ba, Sb, Y and rare earth elements were effective to increase the oxygen gas evolving overvoltage. It is important that the retention of a high energy density should be effectively achieved by the use of a small amount of materials. The Co which is effective even in a small amount may be added in the range of 0.05 to 3.0% by weight, while Cd and the aforementioned elements, Ca, Ag, Mn, Zn, Sr, V, Ba, Sb, Y and rare earth elements should be suitably added in an amount of 5% by weight or less. For the same purpose, as the powdery additives to the positive electrode, besides the aforementioned additives (Co, cobalt oxides), the oxides of Ca, Sr, Ba, Sb, Y, Zn and rare earth elements were found to be effective. The amount of each of the additives should be suitably 5% by weight or less for preventing a great reduction in the filling density with the active materials. A combination of the solid solutions with the powdery additives is more effective. Table 1 indicates the rate of utilization in ambient atmosphere at 45° C. and 60° C. for the 30 Ah sealed cell arranged with 13 positive electrodes (30 Ah) and 14 negative electrodes (45 Ah).

TABLE 1

| Additives (Solid solution formed) | Rate of utilization | | Additives | Rate of utilization | |
|---|---|---|---|---|---|
| | 45° C. | 60° C. | (Powdery) | 45° C. | 60° C. |
| None | 41% | 18% | Co | 45% | 25% |
| Co | 55 | 36 | CoO | 47 | 28 |
| Cd | 59 | 40 | Co(OH)$_2$ | 47 | 29 |
| Ca | 54 | 37 | Ca(OH)$_2$ | 62 | 48 |
| Ag | 49 | 31 | ZnO | 50 | 31 |
| Mn | 46 | 30 | Sr(OH)$_2$ | 55 | 40 |
| Zn | 50 | 32 | Ba(OH)$_2$ | 54 | 35 |
| Sr | 52 | 34 | Sb$_2$O$_3$ | 54 | 38 |
| V | 52 | 32 | Y$_2$O$_3$ | 54 | 35 |
| Ba | 53 | 32 | La(OH)$_3$ | 54 | 33 |
| Sb | 54 | 33 | Ce(OH)$_3$ | 54 | 33 |
| Y | 52 | 31 | | | |
| La | 53 | 32 | | | |

The high temperature problems at the last stage of charging can be applied to the hydrogen storage alloys. That is, as the temperature rises, the equilibrium hydrogen pressure is increased resulting in an increased cell internal pressure. The medium or large capacity cells are not so greatly resistant to pressure so long as a resin container or a metal container of an ordinary thickness is used. A resin container having a wall thickness of 1.5 to 3 mm was significantly deformed at a differential pressure between the outside and the inside of 5 kg/cm$^2$ or more, and occasionally destroyed. It is necessary, therefore, that the cell internal pressure (the difference in pressure from the outside) must be suppressed to a level not higher than the maximum of 5 kg/cm$^2$, preferably on the order of 2 kg/cm$^2$. That is, an increment of the equilibrium hydrogen pressure owing to a rise of temperature and an increment of the cell internal pressure owing to gas evolution at the last stage of charging or later should each be suitably suppressed to 1 kg/cm$^2$, that is, to a total of 2 kg/cm$^2$.

For the suppression of the equilibrium hydrogen pressure, attempts have been made to modify the compositions of the alloys as well as to modify the production of the alloys. In the former, the MmNi$\alpha$ (4.5$\leq\alpha\leq$5.5) is modified by increasing the amount of La in Mm and the amounts of Mn and Co substituting for Ni, while the ZrNi$\beta$ (1.9$\leq\beta\leq$2.4) by increasing the amounts of Ti and V substituting for Zr and Ni, which are both effective. Examples of the MmNi$\alpha$ are given in Table 2.

TABLE 2

| hydrogen storage alloys (AB$\alpha$ system) | | | | | Average pressure (kg/cm$^2$) |
|---|---|---|---|---|---|
| Mm[1] | Ni | Co | Al | | 2.3~2.5 |
| 1.0 | 4.4 | 0.3 | 0.3 | | |
| Mm[1] | Ni | Co | Al | Mn | 1.7~1.85 |
| 1.0 | 4.2 | 0.3 | 0.3 | 0.2 | |
| Mm[1] | Ni | Co | Al | Mn | 1.3~1.45 |
| 1.0 | 4.0 | 0.3 | 0.3 | 0.4 | |
| Mm[1] | Ni | Co | Al | Mn | 1.1~1.25 |
| 1.0 | 3.8 | 0.5 | 0.3 | 0.4 | |
| Mm[1] | Ni | Co | Al | Mn | 0.85~1.05 |
| 1.0 | 3.6 | 0.7 | 0.3 | 0.4 | |
| Mm[2] | Ni | Co | Al | Mn | 0.65~0.8 |
| 1.0 | 3.8 | 0.5 | 0.3 | 0.4 | |
| Mm[3] | Ni | Co | Al | Mn | 0.5~0.65 |
| 1.0 | 3.8 | 0.5 | 0.3 | 0.4 | |

Mm[1] indicates that the amount of La in Mm was 30% by weight
Mm[2] indicates that the amount of La in Mm was 40% by weight
Mm[3] indicates that the amount of La in Mm was 55% by weight The amount of La in Mm of the MmNi$\alpha$ should be preferably 55% by weight or less in view of the reduction in the resistance to oxidation of the alloys, and the total of the elements substituting for Ni should be preferably 2.0 or less as a total replaced atomic weight in view of the reduction in energy density. On the other hand, the amount of Ti in the ZrNi$\beta$ should be 0.4 or less as atomic weight in view of the reduction in crystallinity, and the amount of V should be 0.4 or less as atomic weight for the same reason, and the total thereof together with other substituting elements should be suitably 1.2 or less.

Improvement of the production of the alloys was very effective for the reduction in the equilibrium hydrogen pressure. If any one of the alloy compositions is more homogenized, its PCT curve begins to have a flatter plateau region and a specifically low equilibrium pressure in the hydrogen absorbed state at the last stage of charging as shown in FIG. 2, a-1 and b-1. For this homogenization of the composition, such a technique that the alloy melt is poured in one portion into a vessel having an excellent cooling property to quench the melt was appropriate.

Figure 6:
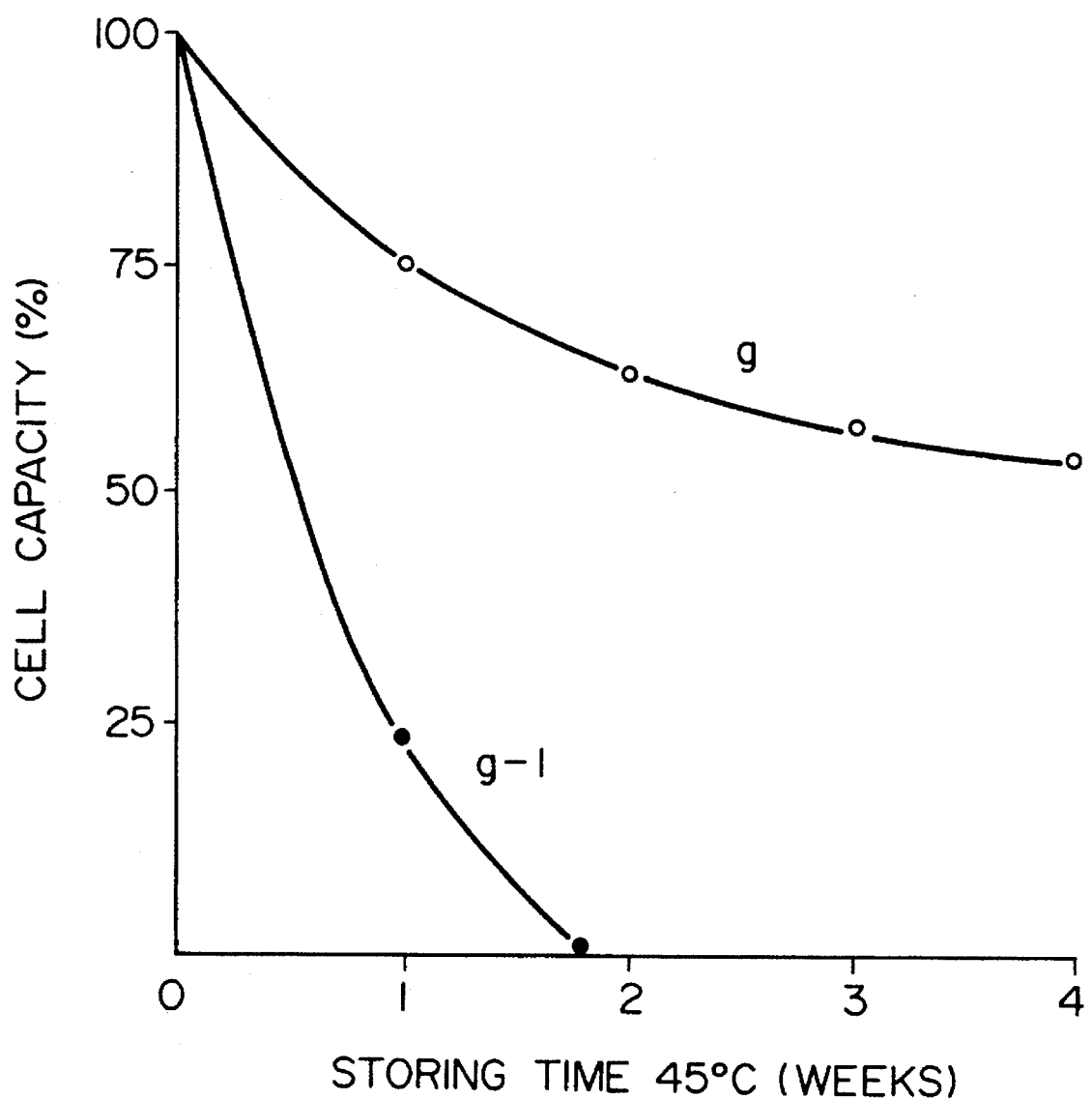
FIG. 6 shows a relationship between the type of separator and the self-discharge of the cell.
Figure 7:
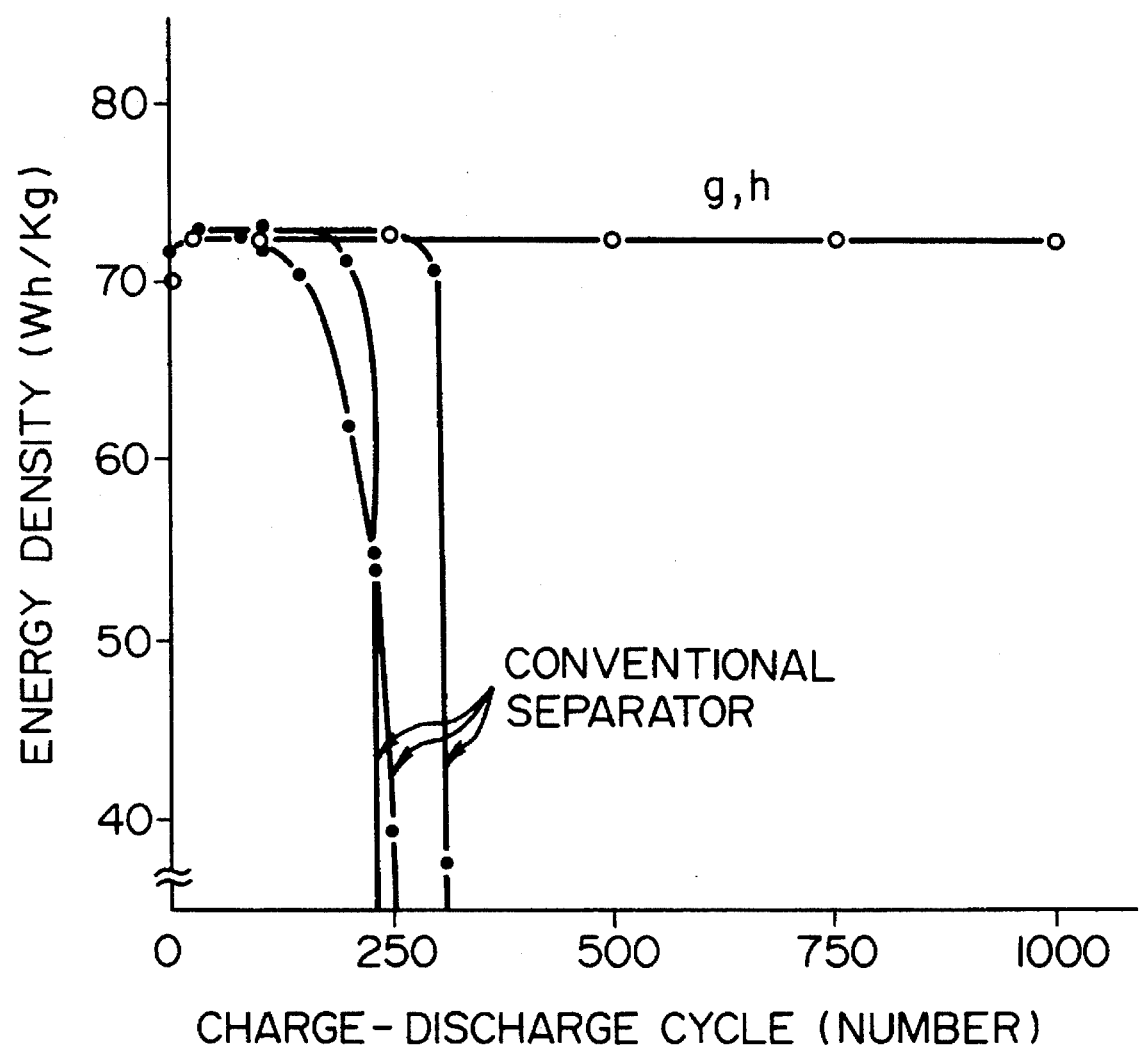
FIG. 7 shows a relationship between the constitution of separator and the charge-discharge cycle life of the cell.

That is, for the reduction in self-discharge, even in the case of the medium or large capacity cells, the use of a separator of polypropylene among polyolefins rather than polyamides is effective. Such a separator was sulfonated, and used. A 30 Ah capacity cell arranged similarly to the aforementioned cell was perfectly charged and then stored at 45° C. The cell exhibited a variation in capacity as shown by a curve g in FIG. 6. By comparison, the variation in capacity of a cell with conventional polyamide nylon 6 separator is shown by a curve g-1. The latter lost the capacity after two weeks, while the former retained a capacity of 55% after four weeks. It can be seen from FIG. 7 that those using conventional separators exhibited fewer charge-discharge cycles.

As the size of electrode is increased, the active materials are more liable to be peeled off during discharging which may cause an increase in self-discharge due to micro-short circuits so that the cell can not withstand a long term severe use. Therefore, one of the most secure ways is to wrap the positive electrode and the negative electrode with a separator in the form of a bag. FIGS. 1(D) and (E) show a schematic view of a wrapped electrode. Here, a part of the top remains unsealed to facilitate removal of gases at the time of injecting the electrolyte. When the separator is fibrous with a directional property, it should be disposed with the direction being vertical for this purpose.

The electrolyte will be described under.

Figure 3:
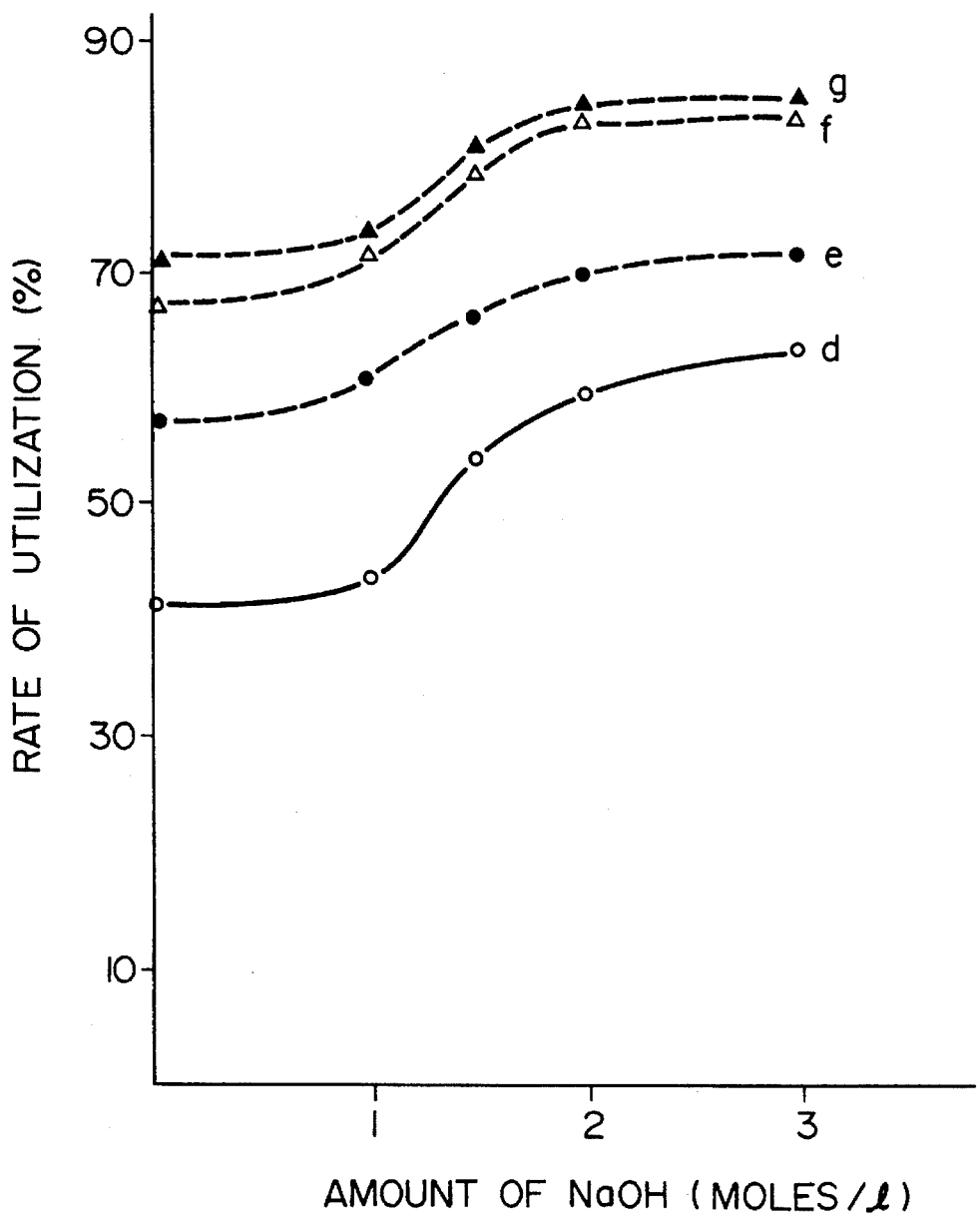
FIG. 3 shows a relationship between the rate of utilization and the amount of NaOH in the electrolyte in the cell at 45° C.

The electrolyte has an influence on the charging efficiency of the positive electrodes at high temperatures and the cell internal pressure. An addition of appropriate amounts of NaOH and LiOH is very effective to the former. FIG. 3 illustrates an example of the rate of utilization in an atmosphere at 45° C. of the 30 Ah capacity cell identical to the aforementioned cell when the numbers of moles of KOH and NaOH were kept constant at 7 moles/l. As the amount of NaOH is increased, the rate of utilization is enhanced. If too much NaOH is added, however, the high efficiency discharge property is deteriorated. An appropriate amount is not higher than 3.5 moles/l. The addition of LiOH was generally effective even in the aforementioned mix composition and an appropriate amount was not higher than 1.5 moles/l. The amount of the electrolyte has an influence on the ability of removing gaseous hydrogen and oxygen evolved after the last stage of charging and 2.8 cc or less per Ah of the positive electrode capacity were effective for removing gases, i.e., an reduction in the internal pressure, in the case of the aforementioned 30 Ah cell. An amount of no larger than 1.3 cc obstructs the electrode reaction so that an approximate amount is in the range of 1.3 to 2.8 cc.

The safety vent will be described under.

Description has been made heretofore with respect to the constitution with an electricity generating element of the medium or large capacity cells having a high energy density even in a wide range of temperature, long life, low self-discharge, and an ability of retaining a low internal pressure until perfect charging. However, such cells as can be evaluated practically must have a cell constitution with a high reliability and safety vent taking into consideration security.

The safety vent had an appropriate structure capable of controlling rubber compression with a metallic spring to protect the vent operating pressure from the influence of an variation in temperature. The vent operating pressure should be preferably in the range of 2 to 3 kg/cm$^2$ as a differential pressure between the inside and the outside taking account of the resistance to pressure of the container.

According to the present invention, the active materials for each of the positive electrode and the negative electrode are supported on a bulk electrode substrate. As a result, the structure itself has a smaller weight and a high retention property allowing for a higher filling density with the active materials. Moreover, by adding as additives any one of the solid solutions and the oxides of Ca, Ag, Mn, Zn, Sr, V, Ba, Sb, Y and rare earth elements to the electrodes, the oxygen gas evolving overvoltage of the positive electrode active materials is increased, thereby retarding the oxygen generation at the last stage of charging. Therefore, one can suppress the rise of temperature of the cells owing to an increase in the amount of the exotherm caused by the reaction of the hydrogen present within the cells or the one at the negative electrodes and the oxygen gas evolving at the positive electrodes at the last stage of charging. As a result, a reduction in the cell capacity due to less acceptability to charge of the positive electrodes can be diminished.

Moreover, the amount of La in Mm of the MmNi$\alpha$ (4.5≦$\alpha$≦5.5) and the amounts of Mn and Co substituting for Ni thereof are increased, and the amounts of Ti and V substituting for Zr and Ni in the ZrNi$\beta$ (1.9≦$\beta$≦2.4) are increased, thereby allowing the equilibrium hydrogen pressure to be reduced. As a result, the rise of the cell pressure can be diminished so that the protection and security of the cell components such as the container and the like can be enhanced.

The electrolyte contains NaOH in an amount not higher than the upper limit of 3.5 moles/l and LiOH in an amount not higher than the upper limit of 1.5 moles/l. As a result, the electrolyte enhances the rate of utilization of the cell and does not lessen the high efficiency discharge property.

The separator to be used is a polypropylene resin separator so that the cell capacity can be retained over an extended period of time as compared with the conventional polyamide separator.

The lid or the container is provided with a resealable safety vent the operating pressure of which was specified in the range of 2 to 3 kg/cm$^2$ as a differential pressure between the inside and the outside of the cell. As a result, the resistance to pressure of the container is sufficient to prevent its destruction.

That is, the sealed metal oxide-hydrogen storage battery described herein contains an electricity generating element consisting of n (n≧2) positive electrodes comprising a major component of metal oxide powder which is filled into and retained by an electrode substrate together with at least one additive for enhancing an oxygen evolving overvoltage to a high density, and n or n+1 (n≧2) negative electrodes comprising a major component of a powdery hydrogen storage alloy having an equilibrium hydrogen pressure at 60° C. in the range of 0.1 to 1.0 kg/cm$^2$ which is filled into or retained by an electrode substrate, and a polyolefin resin separator which has been treated to be rendered hydrophilic.

The present invention will be illustrated with reference to the following Examples. It should be understood, however, that all modifications falling within the spirit and scope of the present invention are intended to be covered by the appended claims.

EXAMPLE 1

To an aqueous solution of nickel sulfate (NiSO$_4$) in a concentration of 0.6 mole/l, there was added cobalt sulfate to a concentration of 0.5% by weight expressed as metal relative to Ni to produce a mixed solution. In addition, an aqueous solution of sodium hydroxide in a concentration of 0.65 mole/l was prepared. The former mixed solution was placed in a cylindrical vessel. With sufficiently stirring, the former was added in portions at a location above the central level and the latter was added in portions at a location below the central level to keep the pH at a constant value of 11.3. The solution was maintained at a temperature of about 35° C. A particulate solid solution of Ni(OH)$_2$ with Co was grown to an average particle size of about 20 μm and then removed continuously to be used as a main active material for the positive electrode. To the resultant particles, there were added a cobalt powder having an average particle size of 5 μm, a calcium hydroxide [Ca(OH)$_2$] powder having a purity not less than 99.5%, and a graphite powder having a purity not less than 99.5% in an amount of 5% by weight, 2% by weight and 3% by weight, respectively, to form homogeneous mixed particles. A paste of the mixed particles in water was filled into a foamed nickel substrate for a electrode substrate having a thickness of 1.6 mm and a porosity of 95%, dried, and thereafter, molded under pressure to produce a nickel positive plate having a thickness of 0.9 mm and a filling density with $Ni(OH)_2$ of about 600 mAh/cc. This plate was cut into specimens of 60×70 mm which were used as nickel positive electrodes having a theoretical capacity of about 2.3 Ah, a schematic cross-sectional view of which is shown in FIG. 1. In the Figure, 11 designates a mixture of the active materials and the additives, 12 designates a foamed nickel, 13 designates a space and 2 designates a positive electrode.

An electroconducting agent, graphite powder has been described, though powdery nickel having a smaller particle size may be used. Specifically for the purpose of achieving a higher energy density per unit weight, the graphite powder allowing for a reduction in weight to some extent was typically used in Examples. As typical powdery additives, Co and $Ca(OH)_2$ (designated g) have been described, though the oxides of Co, Cd, Zn, Sr, V, Ba, Sb, Y and rare earth elements have an effect of improving the acceptability to charging at high temperatures.

Among them, the addition of Co and $Ca(OH)_2$ was one of the most excellent combinations. As comparison, there were produced nickel positive electrodes having an identical structure; (f) containing 5% by weight of Co and 3% by weight of CdO added; (h) containing 5% by weight of Co, 1% by weight of $Ca(OH)_2$ and 2% by weight of ZnO; (d) containing no additive other than graphite; (e) containing only Co. Furthermore, the most popular sintered nickel positive electrode (n) having an identical size and a filling density of 400 mAh/cc was prepared.

A mish-metal containing 48% by weight of cerium and 28% by weight of lanthanum, nickel, cobalt, manganese and aluminum were mixed in a predetermined composition and melted in a high frequency furnace to produce a molten at about 1500° C. which was poured in one portion into a water-cooled copper vessel having a thin space to produce an alloy having a composition of MmNi 3.8 Co 0.5 Mn 0.4 Al 0.3 as one example. An ingot of this alloy was mechanically ground, and then immersed with stirring in an aqueous solution of KOH in a concentration of 7.2 moles/l at 80° C. for 30 minutes, washed with water, and dried to produce particles having an average particle size of about 20 μm. A paste of this powder in water was filled into a foamed nickel substrate having a thickness of 1.0 mm and a porosity of 93%, dried, and thereafter, molded under pressure to produce a nickel negative electrode plate having a thickness of 0.6 mm and a filling density of about 1280 mAh/cc. This plate was cut into specimens of 60×70 mm which were used as negative electrodes of a hydrogen storage alloy having a theoretical capacity of 3.2 Ah.

Other than the alloys as described above, alloys such as ZrMn 0.6 V 0.1 Ni 1.3 TiO 0.2 and the like can occlude a larger amount of hydrogen and has a lower equilibrium pressure so that they are excellent as high energy density alloys. In any case, however, simply cooling the molten in an aluminum vessel results in a significant increase in the equilibrium hydrogen pressure when the concentration of hydrogen is higher, i.e., the amount of occluded hydrogen becomes larger, and there was an occasion where the pressure was over 1 kg/cm² which is preferred for this cell. PCT curves at 60° C. of these alloys are also shown in FIG. 2. Both alloys exhibited evidently a higher effect of reducing the equilibrium hydrogen pressure when quenched (a-1, b-1) than gradually cooled (a, b). Therefore, the cells using the former quenched alloys are expected to have a lower cell internal pressure at the end of charging.

The amount of any one of the formed solid solutions and the powdery additives to be added to the positive electrode active materials was 3% by weight and an amount of graphite as an electroconducting agent of 3% by weight was added. Charging was conducted at 3 A for 12 hours, while discharging was conducted at 9 A and terminated at a voltage of 1.0. The results of 5 cells for each are shown. Any one of the solid solutions and the powdery additives have been observed to have an effect of enhancing the rate of utilization at high temperatures.

Furthermore, there was prepared a non-woven fabric having a nominal weight of 75 g/m² and a thickness of about 0.15 mm by heat-melting polypropylene fibers having a polyethylene coating around the surfaces to integrate the fibers. This non-woven fabric was sulfonated by immersing in 95% sulfuric acid at 100° C. for 5 minutes, then sequentially immersed in solutions of sulfuric acid with decreasing concentrations, and finally washed with water and dried to produce a separator. The aforementioned positive electrodes and negative electrodes were each wrapped with the separator in the form of a bag by affecting heat-fusion. The top of the bag with a lead for the electrode being disposed was only partly sealed by fusing. The resultant structure is shown in FIG. 1, in which 3 designates the lead for electrode, 4 designates the separator and 4-1 designates the fused portion of the separator.

By positioning alternatively 13 positive electrodes and 14 negative electrodes which have been wrapped with separator in overlaying relation to one another there was formed an electricity generating element for 30 Ah capacity sealed nickel-hydrogen storage battery. A group of the electrode plates with a pole, to which a lead was attached via a metal adjunct plate, was inserted into a polypropylene container having a wall thickness of about 2 mm. After a lid was fused onto the container, 60 cc of an electrolyte comprising an aqueous solution of KOH in a concentration of 5 moles/l and NaOH in a concentration of 2 moles/l, into which one mole of LiOH was dissolved were injected into the container, and then a safety vent was inserted to seal the pouring opening, to produce a sealed nickel-hydrogen storage battery.

In the Figure, 1 and 2 designate a negative electrode and a positive electrode, respectively, 3 designates a lead for electrode, 5 designates an electrolyte, 6 designates a pole, 7 designates a space, 9 designates a container, and 10 designates a releasable vent. 8 designates a porous sheet comprising a plurality of separators stacked which is used to prevent sparks between the electrodes from igniting the gaseous oxygen and hydrogen in the space 7. The seal between the pole 6 and the container 9 was accomplished by applying petroleum pitch to both and then compressing the container from opposing upper and under sides with a O-ring which was fixed with a flat washer.

The pressure for operating the releasable vent 10 was set in the range of 2.0 to 2.5 kg/cm² by controlling the position of the spring. FIG. 1(F) shows a schematic cross-sectional view of the releasable vent. 10a designates a polypropylene frame body, 14 designates stainless steel spring, 15 designates ethylene-propylene copolymer rubber, 15-1 designates a fixed portion with the spring, 16 designates a polypropylene bolt capable of changing freely the position of the spring and 17 designates vent hole.

Figure 4:
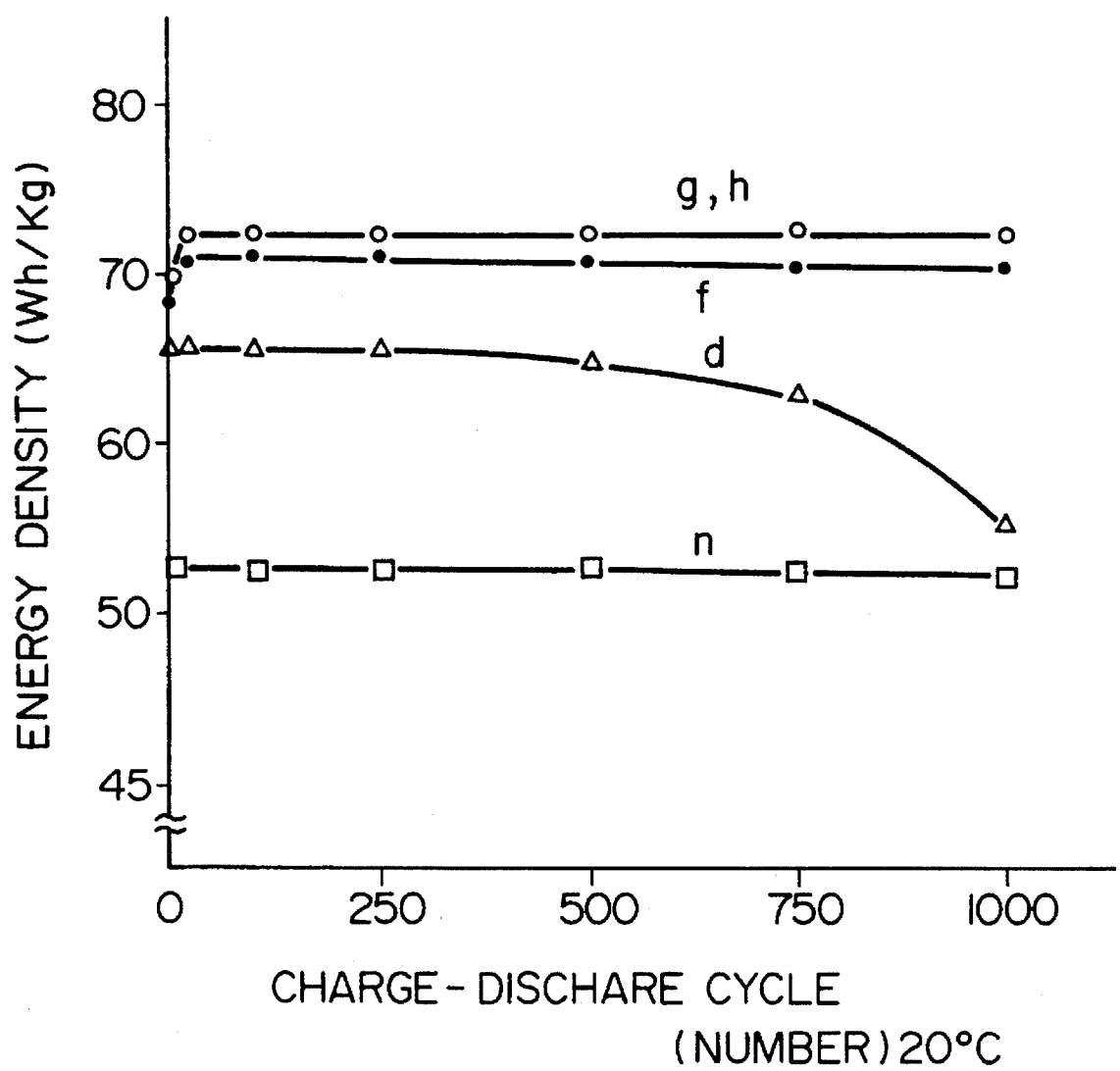
FIG. 4 shows a relationship between the energy density and the discharge cycle of the cell at 20° C.
Figure 5:
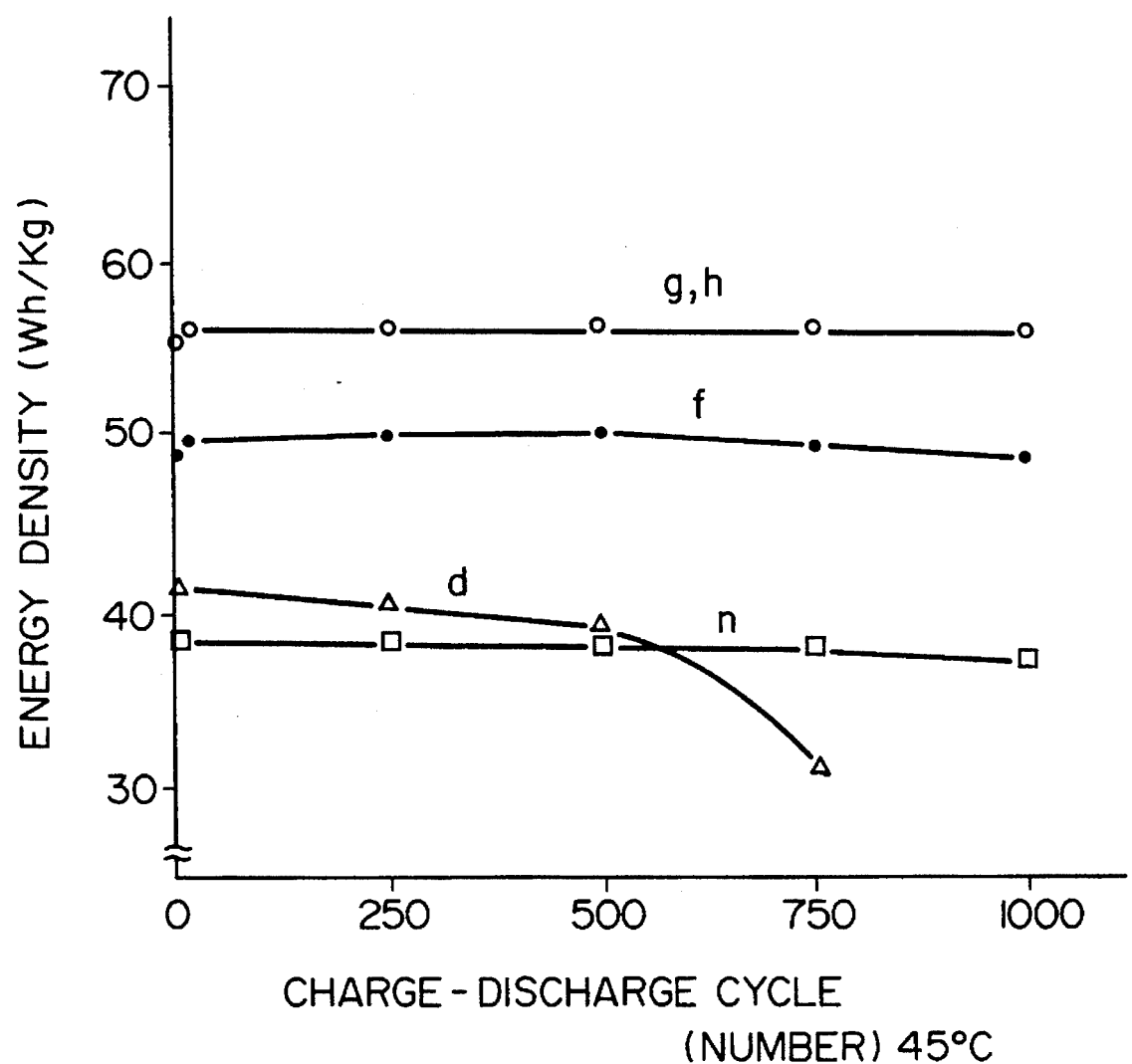
FIG. 5 shows a relationship between the energy density and the discharge cycle of the cell at 45° C.

There were arranged a plurality of sets each including 5 cells of 30 Ah [22-Ah in the case of using the sintered positive electrode (n) because of lower loading level] using the aforementioned positive electrodes (d), (f), (g), (h) and (n), respectively, which cells were evaluated for the relationship between the energy density at the time of charging at 20° C. and the cycles. The results are shown in FIG. 4. In the Figure, the curves represent an average in energy density of three cells with two cells exhibiting the largest energy density and the smallest one being removed out of five. The charging was performed at 0.2 C for 6 hours and the discharging at 0.5 C until reaching 1.0 V. As a result, (f) retained an energy density of 71 Wh/kg, (g) and (h) did 72 Wh/kg, after 1000 cycles. In contrast, (d) exhibited an energy density as low as 65 Wh/kg, and a remarkable reduction in energy density after 500 cycles. (n) exhibited little reduction in energy density with cycles, though its energy density was as low as 52 to 53 Wh/Kg. The different energy densities of (d), (f), (g) and (h) are considered attributable to the different acceptability to charging owing to the oxygen evolving overvoltage of the positive electrodes. This can be supported by the fact that (d) exhibited a rapid rising of the charging voltage, but the risen voltage is low and that correspondingly the cell temperature rises rapidly. The deterioration of the capacity of (d) is considered attributable to the releasable vent which was actuated owing to a high temperature caused by an increase in the level of overcharging. The low energy density of (n) is considered due to a different filling density, and less reduction in capacity is due to less rise of the equilibrium hydrogen pressure even under elevated temperatures because of too large capacity of the negative electrode relative to that of the positive electrode. FIG. 5 shows the results of the identical test in an atmosphere at 45° C. with the charging electric quantity being held at 120% of the initial capacity by controlling the charging time. As can be seen from these results, it is evident that the tendency at 20° C. was enhanced. These results indicate that the nickel-hydrogen storage batteries using the positive electrodes according to the present invention have a greater energy density in an atmosphere in a wide range of temperature and a cycle life of not less than 1000 cycles.

EXAMPLE 2

Positive electrodes and negative electrodes prepared in the same procedure as in Example 1 were cut into specimens of 14.4 mm long×10 mm wide. 13 nickel electrodes and 14 hydrogen storage alloy negative electrodes were alternatively stacked to arrange an electricity generating element, with which a 100 Ah nickel-hydrogen storage battery was manufactured. Other components and the structure were the same as in Example 1. The amount of the electrolyte was 210 cc/cell. Five of these cells were subjected to the charge-discharge test identical to that in Example 1. As a result, they had an energy density of 78 Wh/kg at 20° C., 60 Wh/kg at 45° C., and exhibited little determination in the cycle life even after 500 cycles. Large capacity cells such as a 100 Ah cell according to the present invention were found to have excellent cell characteristics and reliability.

EXAMPLE 3

To an amount of a mixed solution of nickel sulfate and cobalt sulfate prepared in the identical procedure to that in Example 1, there was added the same amount of a 0.6 mole/l manganese sulfate solution to produce a mixture, to which NaOH was added to adjust the pH to 11.5 to prepare eutectic oxide particles of nickel and manganese in an atomic ratio of about 1:1. An average particle size of 20 μm was obtained by controlling the retention time of the particles in the solution. With the particles, three cells of 30 Ah were manufactured in the same procedure as in Example 1 and subjected to the charge-discharge test. As a result, all three cells exhibited only a little reduction in the capacity even after 500 cycles though the voltage reduced about 50 mV. These cells were not specifically superior to the nickel-hydrogen storage battery of Example 1, but attracted a great interest in the use of inexpensive materials such as Mn.

Although the ratio of Mn can be further increased, then it is important that the value of pH is increased to precipitate the oxides.

As above, the present invention can provide a nickel-hydrogen storage battery having a high energy density in a wide temperature range, less self-discharge and a high reliability.

What is claimed is:

1. A medium or large scale sealed metal oxide/metal hydride battery which comprises at least one positive electrode comprising at least one metal oxide, at least one negative electrode comprising a hydrogen storage alloy capable of occluding and releasing hydrogen, a separator, an alkaline electrolyte, a lead for transmitting outward electric current, and a lid equipped with a resealable safety vent and a container, wherein said battery comprises:

an electricity generating element comprising n (n≧2) positive electrodes comprising a major component of metal oxide powder which is filled into and retained by an electrode substrate together with at least one additive for enhancing an oxygen evolving overvoltage to a high level to restrain oxygen evolution in the charging process, said additive being at least one member selected from the group consisting of Ca, Cd, Y, Sr and Ba, and n or n+1 (n≧2) negative electrodes comprising a major component of a powdery hydrogen storage alloy having an equilibrium hydrogen pressure at 60° C. in the range of 0.1 to 1.0 kg/cm$^2$ which is filled into or retained by an electrode substrate, and the separator which comprises polyolefin resin and has been treated to be rendered hydrophilic, and said electrolyte comprising an aqueous alkaline solution containing two or more alkali metals in a quantity of 1.3 to 2.8 cm$^3$ per 1 Ah theoretical loading capacity of said positive electrode, the operating pressure at said vent being 2 to 5 kg/cm$^2$ as a differential pressure between the inside and the outside of the cell.

2. The sealed metal oxide/metal hydride battery according to claim 1, wherein said metal oxide powder is mainly at least one selected from the group consisting of nickel oxide, manganese oxide, and a mixture thereof and solid solutions thereof.

3. The sealed metal oxide/metal hydride battery according to claim 2, wherein the filling density of said metal oxide powder is 580 mAh/cm$^3$ or more at the time of one electron reaction of nickel oxide and manganese oxide.

4. The sealed metal oxide/metal hydride battery according to claim 2, wherein said nickel oxide contains as solid solutions in its crystalline structure 5.0% by weight or less or at least one member selected from the group consisting of Cd, Ca, Sr, Ba, and Y.

5. The sealed metal oxide/metal hydride battery according to claim 2, wherein said positive electrode comprising a major component of metal oxide is incorporated with at least one member selected from the group consisting of 0.1 to 5.0% by weight of at least one member selected from the group consisting of Ca oxide, Sr oxide, Ba oxide, Sb oxide and Y oxide in the powdery form and 0.1 to 10.0% by weight of at least one member selected from the group consisting of Co, Ni and C.

6. The sealed metal oxide/metal hydride battery according to claim 1, wherein said hydrogen storage alloy is mainly a AB$\alpha$ type alloy (4.5≦$\alpha$≦5.5) having a CaCu$_2$ type crystalline structure in which A represents a rare earth metal or a mixture of rare earth metals, a part of which may be replaced by at least one member selected from the group consisting of Ca, Mg, V, Ti, and Zr in an amount corresponding to 0.1 to 0.3 atomic weight, B represents Ni as a major component and at least one member selected from the group consisting of Co, Al, Mn, Cu, Fe, V, Cr and Si in a total amount corresponding to 0.5 to 2.0 atomic weight.

7. The sealed metal oxide/metal hydride battery according to claim 6, wherein said mish-metal contains La in an amount of 25 to 55% by weight.

8. The sealed metal oxide/metal hydride battery according to claim 6, wherein said hydrogen storage alloy comprises crystals having almost a uniform composition by quenching the molten alloy.

9. The sealed metal oxide/metal hydride battery according to claim 1, wherein said hydrogen storage alloy is mainly a AB$\beta$ type alloy (1.9≦$\beta$≦2.4) having a MgCu$_2$ type crystalline structure (C15 type Laves crystalline structure) in which A represents Ni as a major component and at least one member selected from the group consisting of Ti, V, rare earth elements and Ca in an amount corresponding to 0.1 to 0.4 atomic weight, B represents Zr as a major component and at least one member selected from the group consisting of Co, Al, Mn, Cu, Fe, V and Cr in an amount corresponding to 0.3 to 1.2 atomic weight.

10. The sealed metal oxide/metal hydride battery according to claim 9, wherein said hydrogen storage alloy comprises crystals having almost a uniform composition alloy by quenching the molten alloy.

11. The sealed metal oxide/metal hydride battery according to claim 1, wherein said hydrogen storage alloy particles are coated with an electrolyte-proof electroconductive material, or wherein said hydrogen storage alloy particles having a Ni rich surface layer are coated with an electrolyte-proof electroconductive material.

12. The sealed metal oxide/metal hydride battery according to claim 11, wherein said electroconductive material resistant to electrolyte is at least one member selected from the group consisting of Ni, Cu, Co, Ag, Cr, Sn and platinum group metals in the form of fine particles, which is co-melted partly with a part of the hydrogen storage alloy particles.

13. The sealed metal oxide/metal hydride battery according to claim 11, wherein said electroconductive material resistant to electrolyte is a carbon powder, a part of which is taken into said hydrogen storage alloy powder.

14. The sealed metal oxide/metal hydride battery according to claim 11, wherein said metal oxide powder or said hydrogen storage alloy powder is filled into a high porosity substrate made of foamed metal or a high porosity felt made of metal fibers.

15. The sealed metal oxide/metal hydride battery according to claim 14, wherein said high porosity substrate made of foamed metal or a high porosity felt made of metal fibers is made of nickel or at least is plated with nickel.

16. The sealed metal oxide/metal hydride battery according to claim 1, wherein said hydrogen storage alloy powder is applied to a perforated plate or expanded metal with an adhesive.

17. The sealed metal oxide/metal hydride battery according to claim 1, wherein said perforated plate or said expanded metal has surfaces, a large portion of which is made of nickel.

18. The sealed metal oxide/metal hydride battery according to claim 16, wherein said adhesive is at least one synthetic resin selected from the group consisting of potytetrafluoroethylene, polyvinylalcohol, carboxymethyl cellulose, methylcellulose and polystyrol and included in an amount of 1 to 5 wt. % relative to said hydrogen storage alloy powder.

19. The sealed metal oxide/metal hydride battery according to claim 1, wherein said polyolefin separator which has been treated to be rendered hydrophilic is a woven or non-woven fabric composed of fibers, contacts of which are fused to be integrated.

20. The sealed metal oxide/metal hydride battery according to claim 19, wherein said separator is a non-woven fabric composed of fibers, contacts of which are fused to be integrated.

21. The sealed metal oxide/metal hydride battery according to claim 19, wherein said fibers composed mainly of polypropylene have a central portion of polypropylene and a peripheral portion of polyethylene.

22. The sealed metal oxide/metal hydride battery according to claim 1, wherein at least one of said positive electrode and said negative electrode is wrapped with a separator tightly.

23. The sealed metal oxide/metal hydride battery according to claim 22, wherein said separator is formed into a bag form by fusing or mechanically sealing a large portion of the periphery other than the folded edge portion.

24. The sealed metal oxide/metal hydride battery according to claim 19, wherein said non-woven fabric is made of fibers, which are oriented in one direction, said direction being vertical, which is parallel to the top and bottom direction of the electrode.

25. The sealed metal oxide/metal hydride battery according to claim 1, wherein said treatment to render said polyolefin separator hydrophilic is performed by introducing sulfonate groups.

26. The sealed metal oxide/metal hydride battery according to claim 1, wherein said aqueous alkaline solution is an aqueous solution containing a major component of KOH having a specific gravity of 1.15 to 1.35 at 20° C.

27. The sealed metal oxide/metal hydride battery according to claim 26, wherein said aqueous solution containing a major component of KOH contains at least one member selected from the group consisting of 3.5 mole/l of NaOH and 1.5 mole/l or less of LiOH.

28. The sealed metal oxide/metal hydride battery according to claim 1, wherein said lead for transmitting outward electric current comprises two pole rods of positive and negative electrically communicated with each electrode lead of the same pole, and contacts of said pole rods with the lid and the container are sealed by compressing a sealant with a resistant to electrolyte rubber.

29. The sealed metal oxide/metal hydride battery according to claim 28, wherein said rubber is any one of ethylene-propylene copolymer, neoprene and fluorinated resin.

30. The sealed metal oxide/metal hydride battery according to claim 28, wherein said sealant is petroleum pitch.

31. The sealed metal oxide/metal hydride battery according to claim 28, wherein said rubber is in the form of O-ring or a ring having a rectangular cross-section.

32. The sealed metal oxide/metal hydride battery according to claim 1, wherein said resealable safety vent has a structure where a rubber body is disposed in a small hole in the outward portion thereof, which hole is communicating the inside and the outside of the cell, and forced downward by a spring inserted from the top to control the pressure actuating the rubber at the time of opening or closing.

33. The sealed metal oxide/metal hydride battery according to claim 1, wherein said lid and said container are made of synthetic resin, and both are integrated by heat-melting or with an adhesive.

34. The sealed metal oxide/metal hydride battery according to claim 33, wherein said synthetic resin is mainly polypropylene.

35. The sealed metal oxide/metal hydride battery according to claim 1, wherein said electricity generating element has a group of electrodes, between which at least one metal plate having at least the surfaces coated with nickel is interposed, said metal plate being in direct contact with said positive electrode or said negative electrode, or a lead of said metal plate being connected with a lead of either said positive electrode or said negative electrode.

36. The sealed metal oxide/metal hydride battery according to claim 35, wherein said metal plate is a perforated plate or expanded metal.

37. The sealed metal oxide/metal hydride battery according to claim 1, wherein said electricity generating element has a group of electrodes and a lid with a space being formed therebetween within the cell, in which space a porous body is disposed.

38. The sealed metal oxide/metal hydride battery according to claim 37, wherein said porous body is resistant to electrolyte and is a sponge type synthetic resin or a synthetic resin fabric or a synthetic resin non-woven fabric which has continuous voids.

39. The sealed metal oxide/metal hydride battery according to claim 3, wherein said nickel oxide contains as solid solutions in its crystalline structure 5.0% by weight or less of at least one member selected from the group consisting of Cd, Ca, Sr, Ba and Y.

40. The sealed metal oxide/metal hydride battery according to claim 3, wherein said positive electrode comprising a major component of metal oxide is incorporated with at least one member selected from the group consisting of 0.1 to 5.0% by weight of at least one member selected from the group consisting of Ca oxide, Sr oxide, Ba oxide, Sb oxide and Y oxide in the powdery form and 0.1 to 10.0% by weight of at least one member selected from the group consisting of Co, Ni and C.

41. The sealed metal oxide/metal hydride battery according to claim 6, wherein said hydrogen storage alloy powder is applied to a perforated plate or expanded metal with an adhesive.

42. The sealed metal oxide/metal hydride battery according to claim 8, wherein said hydrogen storage alloy powder is applied to a perforated plate or expanded metal with an adhesive.

43. The sealed metal oxide/metal hydride battery according to claim 9, wherein said hydrogen storage alloy powder is applied to a perforated plate or expanded metal with an adhesive.

44. The sealed metal oxide/metal hydride battery according to claim 10, wherein said hydrogen storage alloy powder is applied to a perforated plate or expanded metal with an adhesive.

45. The sealed metal oxide/metal hydride battery according to claim 11, wherein said hydrogen storage alloy powder is applied to a perforated plate or expanded metal with an adhesive.

46. The sealed metal oxide/metal hydride battery according to claim 16, wherein said hydrogen storage alloy powder is applied to a perforated plate or expanded metal with an adhesive.

47. The sealed metal oxide/metal hydride battery according to claim 6, wherein said perforated plate or said expanded metal has surfaces, a large portion of which is made of nickel.

48. The sealed metal oxide/metal hydride battery according to claim 8, wherein said perforated plate or said expanded metal has surfaces, a large portion of which is made of nickel.

49. The sealed metal oxide/metal hydride battery according to claim 9, wherein said perforated plate or said expanded metal has surfaces, a large portion of which is made of nickel.

50. The sealed metal oxide/metal hydride battery according to claim 10, wherein said perforated plate or said expanded metal has surfaces, a large portion of which is made of nickel.

51. The sealed metal oxide/metal hydride battery according to claim 11, wherein said perforated plate or said expanded metal has surfaces, a large portion of which is made of nickel.

52. The sealed metal oxide/metal hydride battery according to claim 16, wherein said perforated plate or said expanded metal has surfaces, a large portion of which is made of nickel.

53. The sealed metal oxide/metal hydride battery according to claim 41, wherein said adhesive is at least one synthetic resin selected from the group consisting of polytetrafluoroethylene, polyvinylalcohol, carboxymethyl cellulose, methylcellulose and polystyrol and included in an amount of 1 to 5 wt. % relative to said hydrogen storage alloy powder.

54. The sealed metal oxide/metal hydride battery according to claim 42, wherein said adhesive is at least one synthetic resin selected from the group consisting of polytetrafluoroethylene, polyvinylalcohol, carboxymethyl cellulose, methylcellulose and polystyrol and included in an amount of 1 to 5 wt. % relative to said hydrogen storage alloy powder.

55. The sealed metal oxide/metal hydride battery according to claim 43, wherein said adhesive is at least one synthetic resin selected from the group consisting of polytetrafluoroethylene, polyvinylalcohol, carboxymethyl cellulose, methylcellulose and polystyrol and included in an amount of 1 to 5 wt. % relative to said hydrogen storage alloy powder.

56. The sealed metal oxide/metal hydride battery according to claim 44, wherein said adhesive is at least one synthetic resin selected from the group consisting of polytetrafluoroethylene, polyvinylalcohol, carboxymethyl cellulose, methylcellulose and polystyrol and included in an amount of 1 to 5 wt. % relative to said hydrogen storage alloy powder.

57. The sealed metal oxide/metal hydride battery according to claim 45, wherein said adhesive is at least one synthetic resin selected from the group consisting of polytetrafluoroethylene, polyvinylalcohol, carboxymethyl cellulose, methylcellulose and polystyrol and included in an amount of 1 to 5 wt. % relative to said hydrogen storage alloy powder.

58. The sealed metal oxide/metal hydride battery according to claim 46, wherein said adhesive is at least one synthetic resin selected from the group consisting of polytetrafluoroethylene, polyvinylalcohol, carboxymethyl cellulose, methylcellulose and polystyrol and included in an amount of 1 to 5 wt. % relative to said hydrogen storage alloy powder.

59. The sealed metal oxide/metal hydride battery according to claim 20, wherein said non-woven fabric is made of fibers, which are oriented in one direction, said direction being vertical, which is parallel to the top and bottom direction of the electrode.

60. The sealed metal oxide/metal hydride battery according to claim 21, wherein said non-woven fabric is made of fibers, which are oriented in one direction, said direction being vertical, which is parallel to the top and bottom direction of the electrode.

61. The sealed metal oxide/metal hydride battery according to claim 22, wherein said non-woven fabric is made of fibers, which are oriented in one direction, said direction being vertical, which is parallel to the top and bottom direction of the electrode.

62. The sealed metal oxide/metal hydride battery according to claim 23, wherein said non-woven fabric is made of fibers, which are oriented in one direction, said direction being vertical, which is parallel to the top and bottom direction of the electrode.

63. The sealed metal oxide/metal hydride battery according to claim 29, wherein said rubber is in the form of O-ring or a ring having a rectangular cross-section.

* * * * *